2,995,660
DETECTOR
Alexander Lempicki, Forest Hills, N.Y., assignor, by mesne assignments, to Sylvania Electric Products Inc., Wilmington, Del., a corporation of Delaware
Filed Sept. 28, 1956, Ser. No. 612,676
2 Claims. (Cl. 250—83.3)

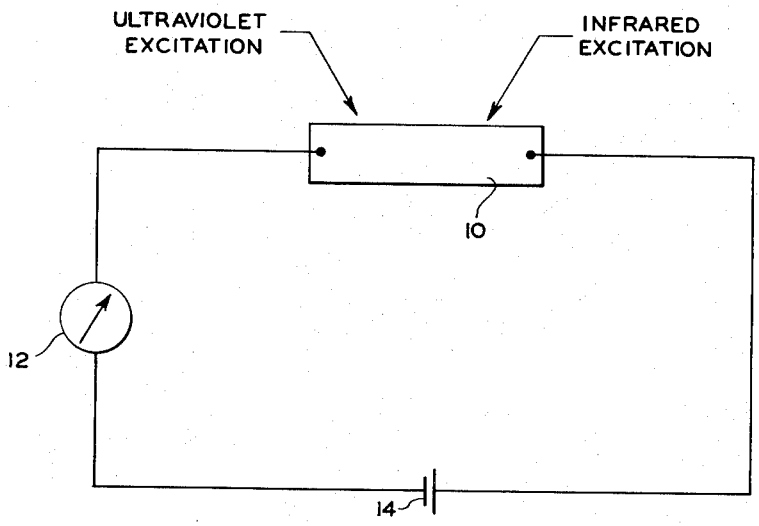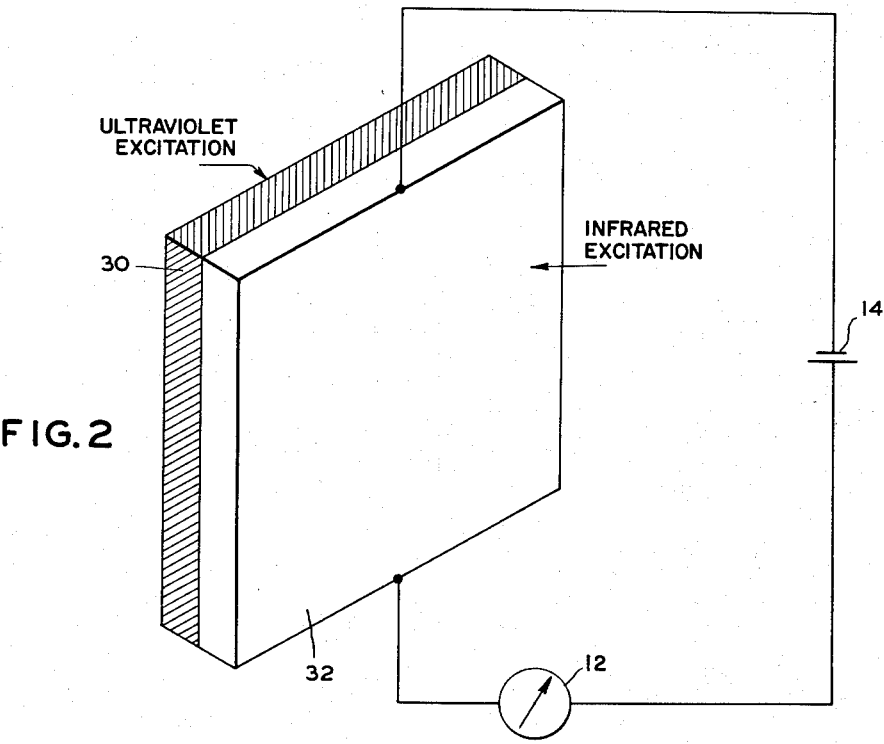

My invention relates to devices for detecting the presence of incident infrared radiation.

It is an object of the present invention to detect the presence of infrared radiation by photoconductive quenching.

Another object is to provide a new and improved infrared detector employing infrared photoconductive quenching.

Still another object is to utilize luminescent photoconductors as infrared detectors.

These and other objects of my invention will either be explained or will become apparent hereinafter.

Certain photoconductors, such as zinc sulphide, or cadmium sulphide, when illuminated by incident light of a suitable wavelength, will exhibit a sharply reduced electrical resistance. If an illuminated photoconductor of this type is simultaneously exposed to infrared radiation, the resistance of the photoconductor will increase toward its original value. This phenomenon is known as infrared photoconductive quenching.

Hence, when a photoconductor of the type described is connected in an electric circuit and illuminated, the change in resistance will cause a current (the photocurrent) to flow through the photo conductor. When the illuminated photo conductor is quenched by infrared radiation, the photocurrent will decrease due to the increase in resistance of the photo conductor. The amount of current decrease provides a measure of the amount of incident infrared energy.

This type of measurement can be obtained by applying a voltage across a photoconductive element responsive to infrared quenching; illuminating the element with light of a wavelength causing photoconductivity and measuring the current flowing through the element; then quenching the illumination with incident infrared radiation and again measuring the current; and finally computing the difference between these currents to provide a measure of the infrared energy utilized in quenching.

Illustrative embodiments of my invention will now be described in detail in the accompanying drawing, wherein FIG. 1 illustrates in simplified form apparatus which can be used for detecting infrared radiation in the manner described above; and FIG. 2 illustrates a sandwich like structure and associated circuitry which can be used in place of the apparatus of FIG. 1.

Referring now to FIG. 1, there is shown a photoconductive layer or element 10 which is subject to infrared photoconductive quenching. In this example, this element is a zinc sulphide crystal which is photoconductively responsive to ultraviolet light illumination. The element 10 is connected in series with an electrometer 12 and a battery 14.

In the operation of this apparatus, ultraviolet light from a suitable source (in this example, a mercury lamp) is directed upon the element 10 and illuminates it, the value of the resultant photoconductive current being indicated on the electrometer 12. The illuminated element 10 is then irradiated with infrared radiation, supplied in this example from an incandescent lamp masked with an infrared pass filter. Quenching action ensues, and the value of the resultant quenched current is indicated on the electrometer. The difference between the quenched and unquenched photocurrents provides a measure of the amount of infrared energy utilized in quenching. Typical test data yielded by the apparatus of FIG. 1 is tabulated in Table I below.

Table I

| Ultraviolet intensity | Voltage across crystal (volts) | Unquenched photocurrent (microamp.) | Quenched photocurrent (microamp.) | Percent quenching | Infrared intensity, microwatts/cm.² |
|---|---|---|---|---|---|
| High | 400 | 80 | 40 | 50 | 60 |
| Medium | 300 | 80 | 3.2 | 96 | 60 |
| Low | 2,000 | 80 | 8.0 | 90 | 60 |

The intensity of the infrared radiation used above was measured by conventional means. After the quenched and unquenched photocurrents have been measured for various levels of infrared intensity, the photoconduction tested can be calibrated and thereafter used as an infrared detector.

The apparatus of FIG. 2 functions in the same manner, utilizing a sandwich like structure composed of two layers 30 and 32 in place of the separate ultraviolet light source and photoconductive layer of FIG. 1. Layer 32 is a photoconductive layer and corresponds to element 10 of FIG. 1. Layer 30 is formed from a material which is rendered luminescent and produces light of a wavelength suitable for illuminating layer 32. Layer 30 can be rendered luminescent by applying a voltage across it (electroluminescence), by bombarding it with electrons or by illuminating it with ultraviolet radiation. Hence, the sandwich like structure consists of two layers, one of which generates the exciting radiation, while the other functions as an infrared detector.

While I have shown and pointed out my invention as applied above, it will be apparent to those skilled in the art that many modifications can be made within the scope and sphere of my invention as defined in the claims which follow.

What is claimed is:

1. An infrared detector for measuring the energy of infrared radiation incident thereto, said detector comprising a photoconductor layer; a circuit coupled to said photoconductor layer, said circuit including means to apply a direct voltage of constant value to said photoconductor layer whereby said photoconductor layer acts as a resistance, said photoconductor layer, when in the dark, having a relatively high given resistance value and, when illuminated by visible light, having a much lower resistance value, said photoconductor layers, when so illuminated and at the same time irradiated with said infrared radiation, exhibiting a resistance which increases toward its original value in accordance with the energy of said radiation; a phosphorescent layer positioned in juxtaposition to said photoconductor layer, said phosphorescent layer, when excited, illuminating said photoconductor layer with visible light; means external to said circuit to excite said phosphorescent layer; means to irradiate said illuminated photoconductor layer with infrared; and a meter connected in circuit with the photoconductor layer and said means to apply a direct voltage whereby the difference in the photocurrents flowing through the illuminated photoconductor layer and said meter in the presence and absence of infrared provides a measure of the energy of the infrared radiation.

2. A detector as set forth in claim 1 wherein said phosphorescent layer is an electroluminescent layer.

(References on following page)

References Cited in the file of this patent

UNITED STATES PATENTS

| | | | |
|---|---|---|---|
| 2,692,950 | Wallace | Oct. 26, | 1954 |
| 2,706,792 | Jacobs | Apr. 19, | 1955 |
| 2,739,244 | Sheldon | Mar. 20, | 1956 |
| 2,765,385 | Thomsen | Oct. 2, | 1956 |
| 2,773,992 | Ullery | Dec. 11, | 1956 |
| 2,794,926 | Watts | June 4, | 1957 |
| 2,861,903 | Heimann | Nov. 25, | 1958 |
| 2,879,182 | Pakswer | Mar. 24, | 1959 |
| 2,899,560 | Nemet | Aug. 11, | 1959 |
| 2,961,542 | Cartwright et al. | Nov. 22, | 1960 |

FOREIGN PATENTS

| | | | |
|---|---|---|---|
| 661,162 | Great Britain | Nov. 21, | 1951 |
| 685,027 | Great Britain | Dec. 31, | 1952 |

OTHER REFERENCES

The Photoconductivity of Incomplete Phosphors, Physical Review, vol. 72, No. 7, Oct. 1, 1947, page 594.

Photoconductors articles by Bube, p. 1836, and by Rose, p. 1850, in Proceedings of IRE, December 1955.

RCA Tech Notes, No. 43, August 9, 1956.